Feb. 15, 1955
J. A. DREYFUS
2,702,369
DYNAMIC INDICATOR
Filed Jan. 14, 1949
7 Sheets-Sheet 2
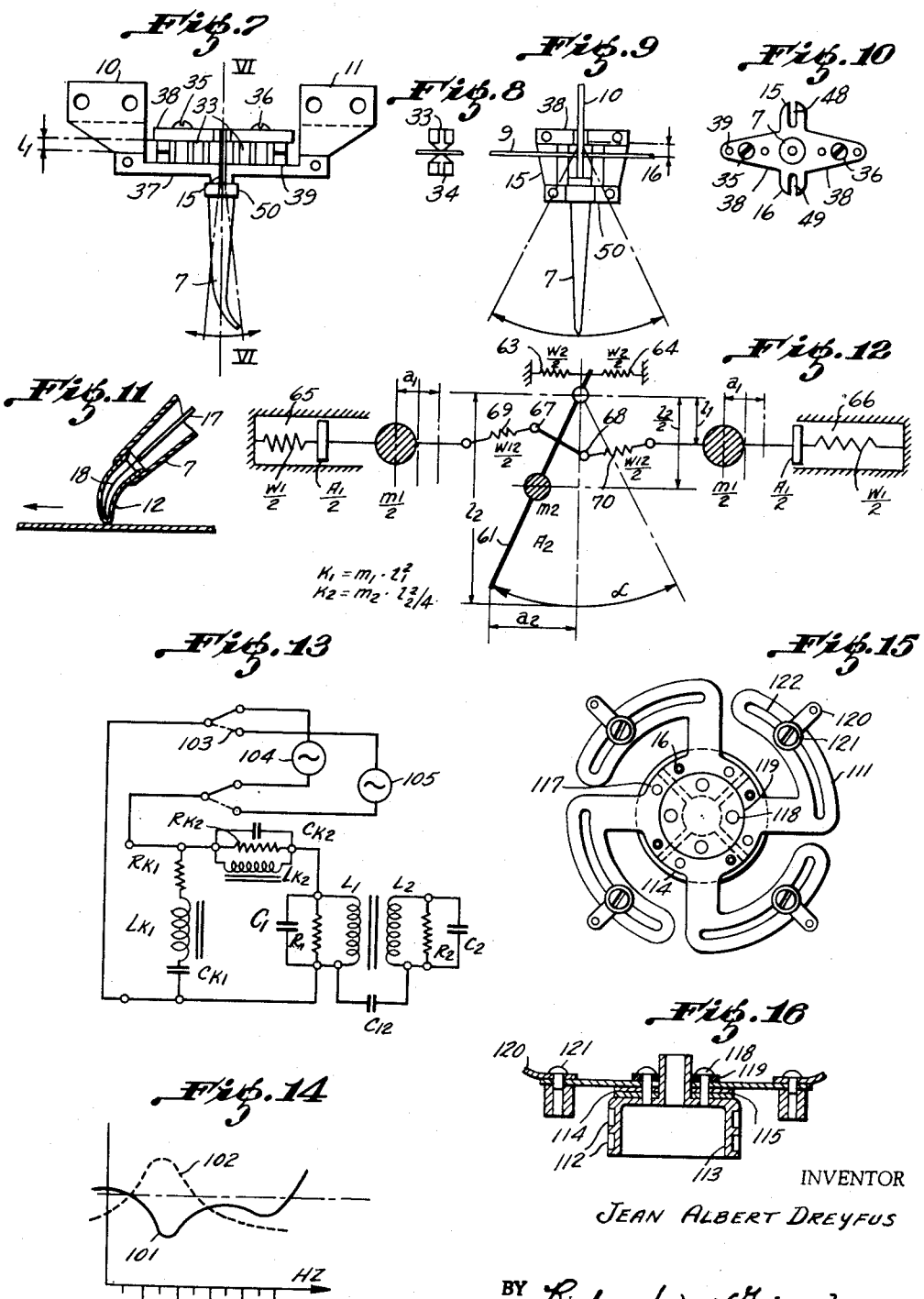
INVENTOR
JEAN ALBERT DREYFUS
BY Richards & Geier
ATTORNEYS

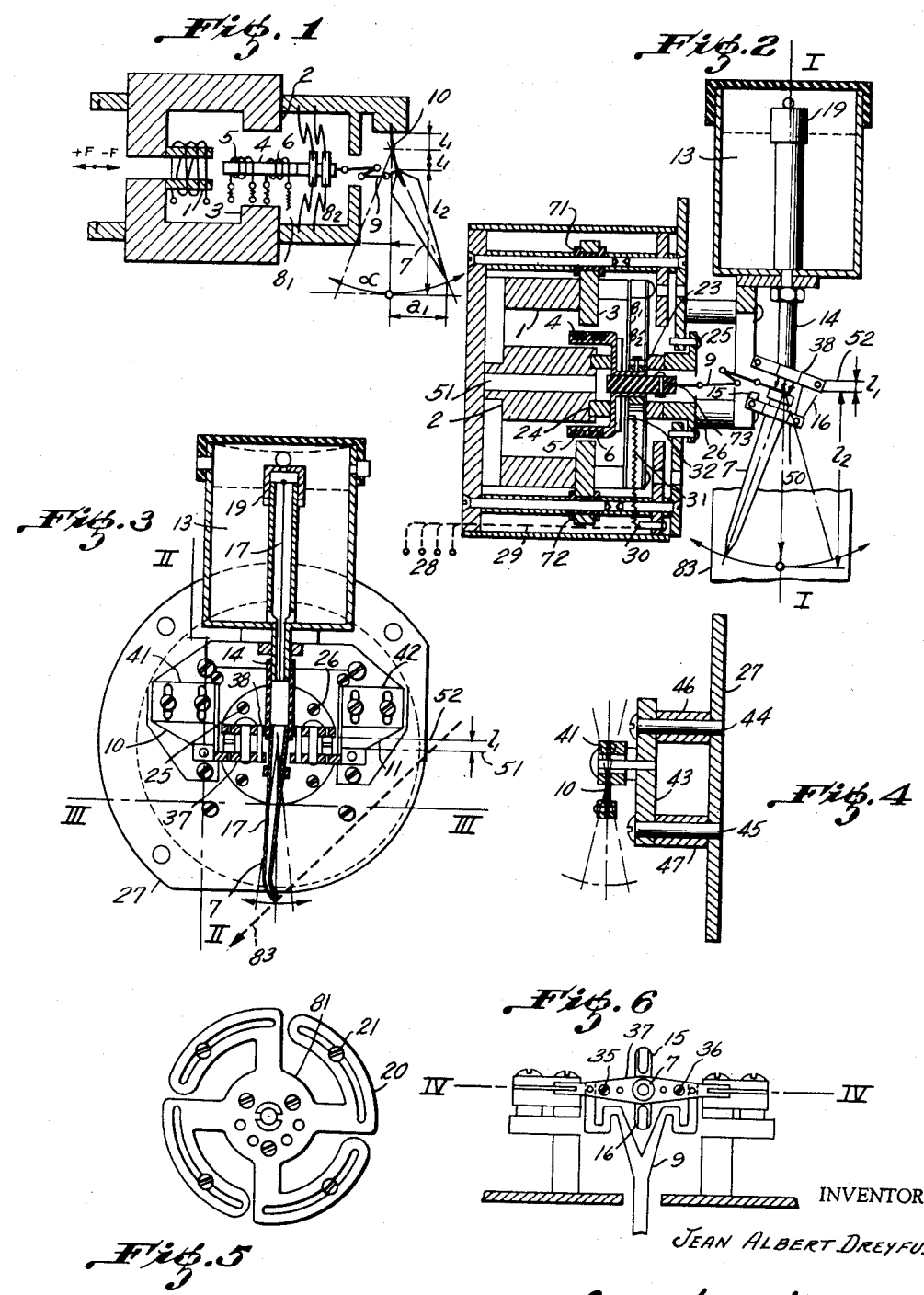

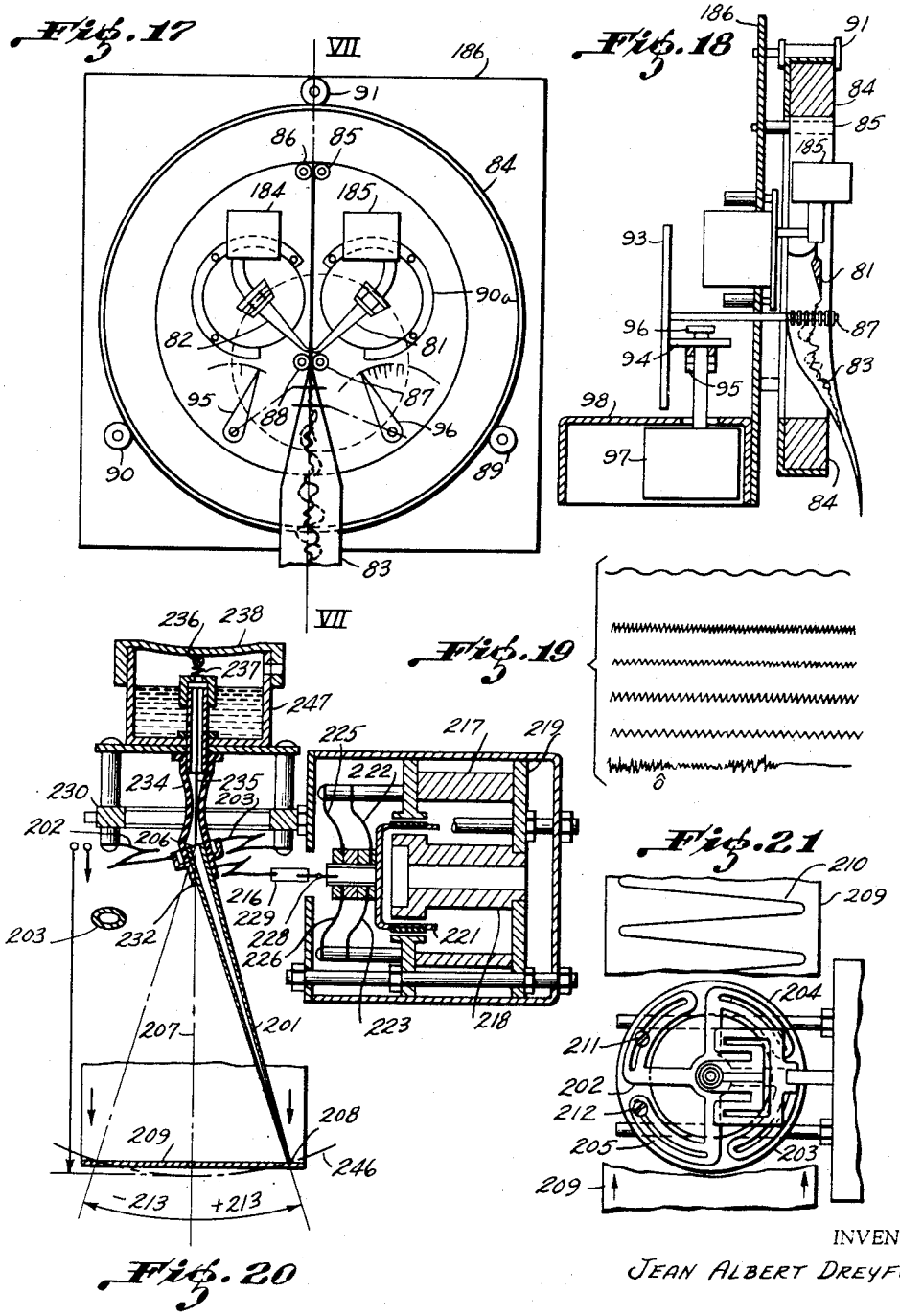

Feb. 15, 1955  J. A. DREYFUS  2,702,369
DYNAMIC INDICATOR
Filed Jan. 14, 1949  7 Sheets-Sheet 4
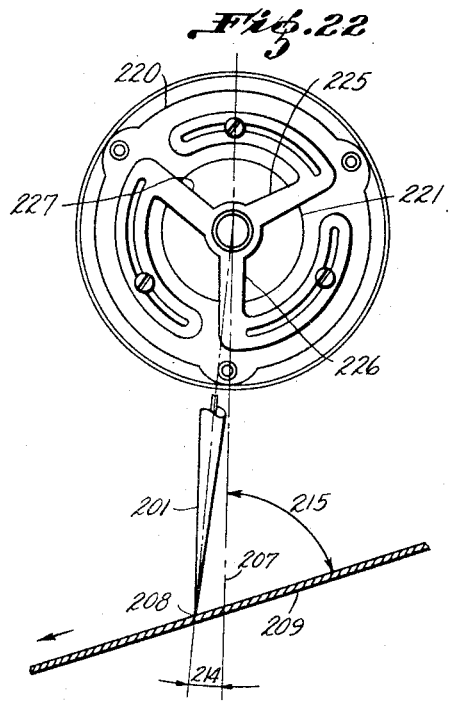
Fig.22
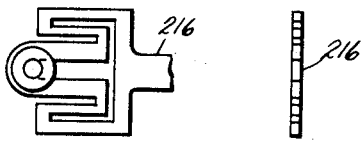
Fig.23  Fig.24
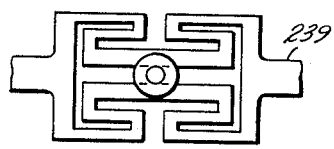
Fig.25
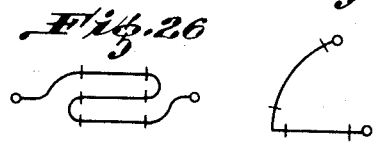
Fig.26  Fig.27
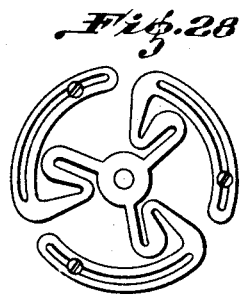
Fig.28
Fig.29
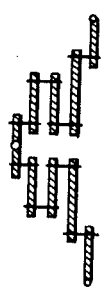
Fig.30  Fig.31
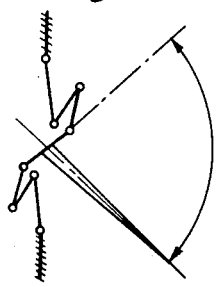
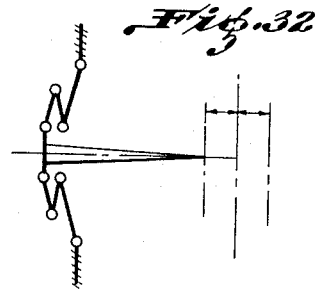
Fig.32
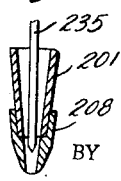
Fig.33
INVENTOR
JEAN ALBERT DREYFUS
BY
Richards & Geier
ATTORNEYS Feb. 15, 1955 J. A. DREYFUS 2,702,369
DYNAMIC INDICATOR
Filed Jan. 14, 1949 7 Sheets-Sheet 5
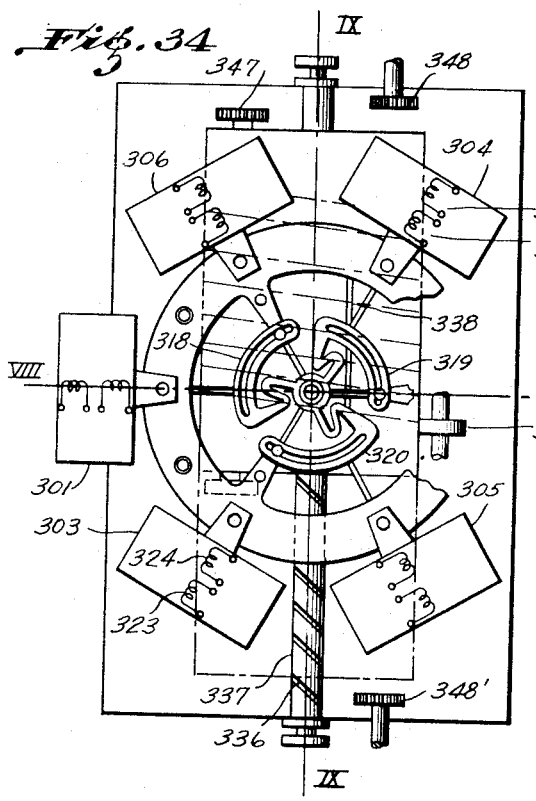
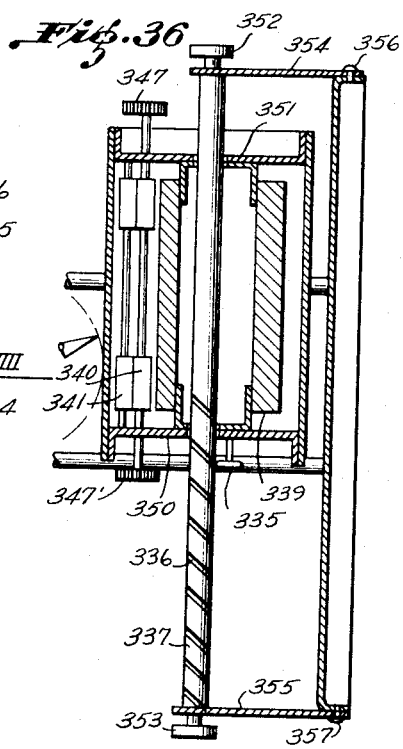
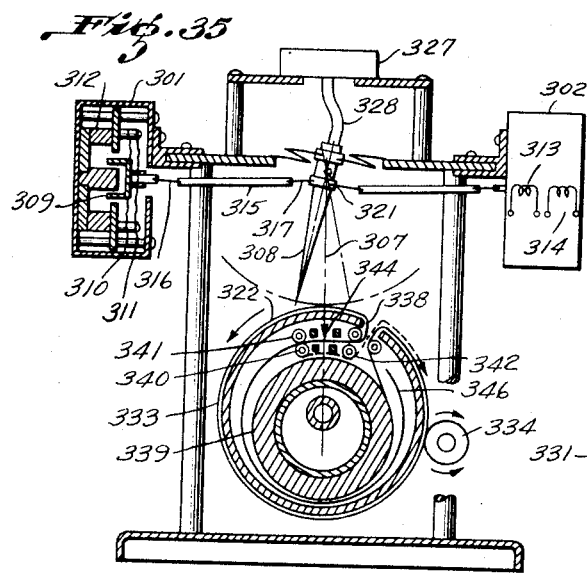
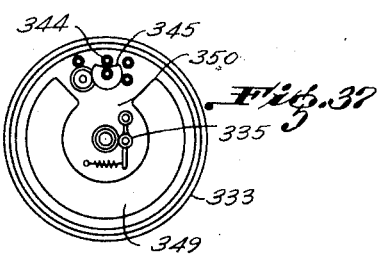
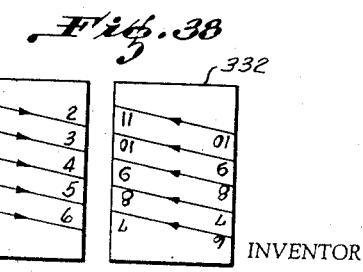
INVENTOR
JEAN ALBERT DREYFUS
BY Richards & Geier
ATTORNEYS Feb. 15, 1955  J. A. DREYFUS  2,702,369
DYNAMIC INDICATOR
Filed Jan. 14, 1949  7 Sheets-Sheet 6
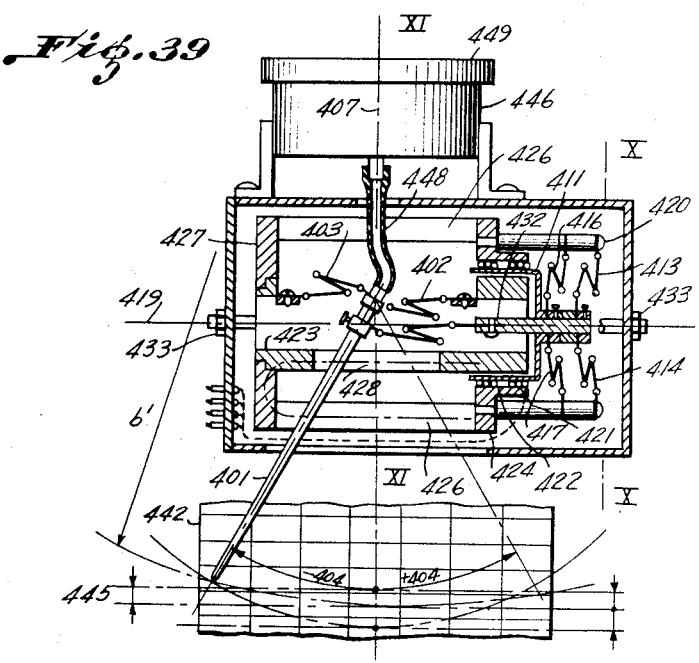
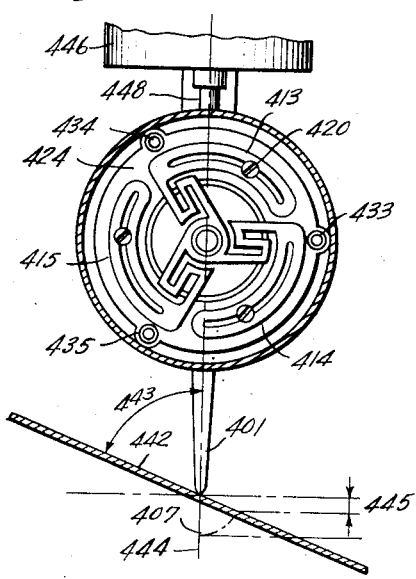
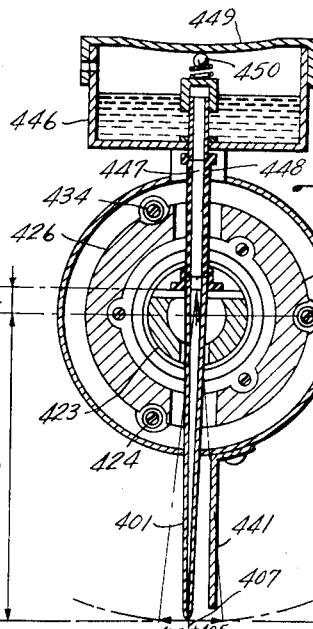
INVENTOR
JEAN ALBERT DREYFUS
BY Richards & Geier
ATTORNEYS Feb. 15, 1955 — J. A. DREYFUS — 2,702,369
DYNAMIC INDICATOR
Filed Jan. 14, 1949 — 7 Sheets-Sheet 7
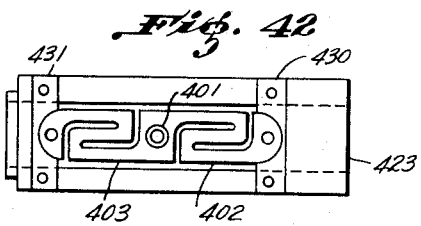
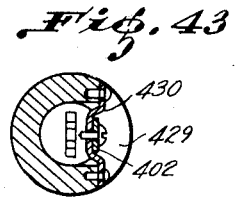
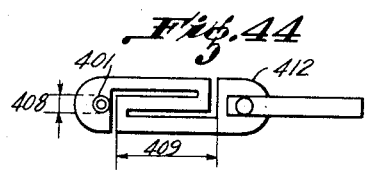
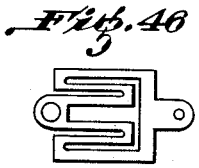
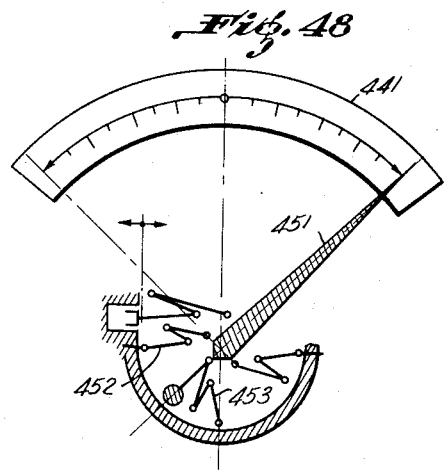
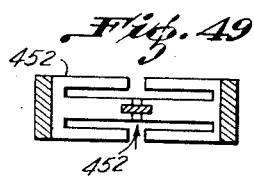
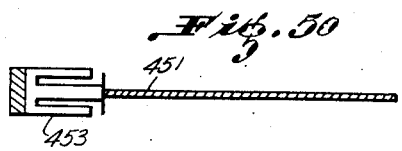
INVENTOR
JEAN ALBERT DREYFUS
BY Richards & Geier
ATTORNEYS United States Patent Office
2,702,369
Patented Feb. 15, 1955

2,702,369

DYNAMIC INDICATOR

Jean Albert Dreyfus, Geneva, Switzerland

Application January 14, 1949, Serial No. 70,937

11 Claims. (Cl. 324—145)

This application is a continuation in part of my co-pending patent application Serial Number 67,900, filed December 29, 1948, now Patent Number 2,540,660.

Dynamic indicators, such as, for example, direct-reading or self-recording ammeters, electro-mechanical oscillographs or other similar apparatus which convert electro-magnetic or other forces into mechanical displacements of a point of a needle, are known. This point may be displaced relatively to a graduated scale known as a dial (direct-reading) or may inscribe or record graphs on a flexible and movable strip, for example, a paper strip, by an inking, electro-chemical or thermo-electrical process, or by engraving on waxed or blackened paper or the like (recorded reading).

The dial may be graduated in amperes, volts, ohms, watts, atmospheres, millimeters or other units of measurement. The recording strip may be squared in millimeters, or be free from any kind of marking.

According to the known devices, such as movable frame electrical measuring instruments or electro-mechanical oscillographs, the needle is suspended by a pivot which turns in fixed bearings. Its moment of inertia is interdependent on that of a driving motive bobbin or coil. A separate, for example, spiral spring supplies an opposing elastic moment. Generally, this coil is of square section and it turns between the pole pieces of a magnet when it is traversed by the current to be measured or indicated.

These known devices have various disadvantages, such as:

1. The pivots are subject to play and wear, and the friction thereof is critical. Shocks can easily affect it and its equilibrium position is subject to variations, similarly, affecting the readings. The play and the moments of inertia do not admit of true reproduction of current variations beyond a certain frequency limit, which is in the order of about one hundred Hertz.

2. The bearings of the needle pivot being fixed, and a recording needle having to exert a controllable elastic pressure on the recording surface, the needle must oscillate in a plane which makes an acute angle with the recording surface. Consequently, the graphs or records are made with a circular deformation, which become all the more apparent as the angle becomes more acute and the relative amplitude of the records become greater.

3. In order to be able to execute two-dimensional movements, the needle must be equipped with supplementary pivots and rods which increase the moments of inertia, whilst lowering still more the frequency limit.

These disadvantages are obviated by the devices in accordance with the invention, which also provide other improvements.

The needle is acted upon or pulled by at least one leaf spring, which is bent in the same plane as that of the leaf spring in the rest position. This leaf spring may act either for the suspension of the needle or for the coupling with the motive or driving member, or two similar and parallel springs may serve for these two ends. Each leaf spring is the equivalent of several pivots and torsion rods free from play, wear and external frictions. The result of this is an excellent swivel joint, provided rotatively and axially with various controllable opposing moments of elasticity, while remaining rigid in the directions located in the plane of the leaf spring.

When employed as suspension and coupling springs, these blades or leaf springs enable translatory movements of the driving member to be converted into amplified movements of rotation or translation of the needle point.

By suitably selecting the ratio of amplification, the needle and its cranked springs may act as transformers of dynamic moments. In this way, indicators are obtained which are practically insensitive to shocks, which are able to reproduce acoustic frequencies of several hundreds or thousands Hertz, and which are able to provide graphs or recordings having a large relative amplitude and free from circular distortions.

In the case of an electro-dynamic indicator, the coupling springs may be disposed within a magnetic core and the indicating needle may pass through parallel slots in the magnetic axis, formed in the core and in the magnet. The mechanical distances being thus shortened, the result is an increased stability and a reduced size.

Several devices in accordance with the invention, are illustrated, by way of example, in Figs. 1–50.

Fig. 1 is a diagrammatic section of an oscillograph writing device comprising a needle suspended by a system of spring pivots disposed in the axial plane of the needle in the rest position;

Figs. 2 to 11 are sections and detail views of the writing device shown in Fig. 1;

Fig. 2 is a section of an oscillograph writing device in a first form of execution.

Fig. 3 is a section along the line III—III of Fig. 2.

Fig. 4 is a section along the line IV—IV of Fig. 3.

Fig. 5 is a front view of one of the spring blades supporting the movable member.

Fig. 6 is a section along the line VI—VI of Fig. 3.

Fig. 7 is a part of a section along the line VII—VII of Fig. 6.

Fig. 8 is a section along the line VIII—VIII of Fig. 7.

Fig. 9 is a section along the line IX—IX of Fig. 7.

Fig. 10 is a view of the needle support.

Fig. 11 is a view of the needle point.

Fig. 12 is the equivalent mechanical diagram of the writing device of Figs. 1–11;

Fig. 13 is the equivalent electrical diagram thereof, with electric filters for compensating mechanical resonances;

Fig. 14 indicates the mechanical and electrical resonance curves;

Figs. 15 and 16 are respectively a plan view and a section of an improved driving coil suspension;

Figs. 17 and 18 are respectively a plan view and a section of a double oscillograph permitting superposed recording of two oscillations on the front and rear of the same transparent band or strip;

Fig. 19 shows an example of a phonetic oscillogram obtained with the devices described;

Figs. 20, 21, and 22 relate to an oscillograph having its needle suspended by a system of springs located in a plane about normal to the axis of the needle at rest, this system constituting a pivot which is elastic axially and two-dimensional; Fig. 20 is a vertical section through the oscillograph, Fig. 21 is a horizontal section along the line XXI—XXI of Fig. 20 and Fig. 22 is a vertical section along the line XXII—XII of Fig. 20.

Figs. 23 to 32 indicate various suspension springs and also their functions;

Fig. 33 is an enlarged section of the point of an inking needle or pointer;

Figs. 34 to 37 are a view and some sections of a two-dimensional oscillograph having 6 components and automatic replacement of the recording strip, the axes of inscription thereof being indicated in Fig. 38;

Figs. 39 to 50 illustrate dynamic indicators in accordance with the invention, which may be utilised either for direct-reading or self-recording electrical measuring instruments or for electro-mechanical oscillographs of improved performance capable of recording acoustic or sub-acoustic frequencies;

Fig. 39 is an axial section of the indicator;

Figs. 40 and 41 are sections according to A—A and B—B of Fig. 39;

Figs. 42 and 43 are a view and a section of the magnetic core of Fig. 39;

Figs. 44 and 45 are a view and a section of the coupling spring of Fig. 39;

Figs. 46 and 47 are a view and a section of a modification of a symmetrical coupling spring;

Figs. 48 to 50 are diagrammatic sections of an indicator, the needle of which is suspended by at least two cranked blade or leaf springs, disposed in two planes orthogonally of one another. Two of these orthogonal pairs of cranked blades, disposed on opposite sides of a movable frame, could advantageously replace the usual suspension pivots.

According to Figs. 1–11, the permanent magnet 1 generates a homogeneous magnetic field between the iron armatures 2, 3. The movable bobbin, comprising the core 4 and two symmetrical windings 5, 6, is suspended in the air-gap by two diaphragms $8_1$, $8_2$ which allow it to execute only parallel movements of translation. The translational oscillations of the bobbin 4 are converted into amplified rotational oscillations of the hollow needle 7 by the intermediary of the coupling spring 9. The needle 7 is suspended by the symmetrical springs 10, 11, which constitute the pivots and return springs of this needle. The axis of the needle is inclined at about 45° with respect to the plane of the movable paper strip 83 and its point is bent back at approximately 45°. Thus, the ink, supplied from the reservoir 13 and, passing through the connecting elastic tube 14, flows normally to the paper 83. The symmetrical springs 15, 16 control the pressure of the point 12 on the paper 83. A springy wire 17, terminated by a finer wire 18, seals off the point 12 when it is at rest and opens it automatically when it oscillates. The length of the wire 17, 18 is adjustable by means of the threaded cap 19.

The suspension diaphragm, such as $8_1$ (Figs. 2 and 5), may be composed of a certain number of cranked spring blades, such as 20, provided with circular grooves in which screws, such as 21, may slide. By this means, the spring force of the diaphragm may be regulated. The suspension membrane $8_2$ may be identical with $8_1$, or it may be constructed by a disc of copper, plastic material, rubber or other shock-absorbing material hermetically closing the space defined by the permanent magnet 1 and the armatures 2, 3. This permits the introduction of the desired damping of the movable bobbin 4. As a modification, the damping action may be introduced by two rubber rings 23, 24, the pressure of which, on both sides of the bobbin 4, may be regulated by screws 25 and the ring 26 supported by the plate 27. As a modification or in addition, the bobbin core 4 may comprise an aluminium, anti-corroding or other light, good-conducting metal, as well as two grooves in which the windings 5, 6 are wound. Thus, the electric currents induced in the core 4 tend to damp the movements of the latter.

If, on the contrary, it is desired to avoid any loss of energy by induced currents, the cylindrical bore 4 may be made of metal and provided with an axial slot. The metallic formation of the body 4 cools the windings 5, 6 and enables the density of current admitted to the latter to be considerably increased.

The electric currents are conducted to the windings 5, 6, through the intermediary of terminals, such as 28, wires 29, spade terminals 30, coils 31 and spade terminals 32. As a modification it would be possible to insulate the cranked spring blades or leaves 20 of the suspension diaphragm $8_1$ and thus make them serve in place of the coils 31.

The coupling spring 8 may be of bronze or it may consist of a blade of fork shape and terminated by two symmetrical cranked leaves. This spring is rigid in the axis of the translational oscillations and flexible along a normal axis where the pivoting is desirable. In order to connect this spring 8 to the needle 7, its ends are gripped between the blades 33, 34 by means of the screws 35, 36. The blades are set in two bridges 37, 38 guided by the lugs 39, 40.

The pivot springs 10, 11 are housed at one side in the bridge 37 and at the other side in the adjustable split blocks 41, 42, solid with the plate 27 by means of the support 43, screws 44, 45 and sleeves 46, 47.

The needle tension springs 15, 16 are housed at one end in slots 48, 49 in the bridge 38 and at the other end in the beam or arm 50 which is solid with the needle 7.

At rest, the tension springs are in the plane of oscillation of the needle. The pivot springs are in a plane perpendicular thereto. The coupling spring is in a plane which, at one and the same time, is perpendicular to that of the pivot springs and that of the tension springs. The suspension diaphragms are in a plane parallel to that of the pivot springs.

The needle 7, operated by the coupling spring at the distance $l_1$ cms. from the axis 51 of the movable bobbin, constitutes a displacement-amplifying lever. If the length of the needle is $l_2$ (from its pivot axis to its point) and if the angles of rotation are small, the amplification of the displacements $a_2:a_1$ is in proportion with $l_2:l_1$. The free height of the pivot springs is $2 \cdot l_1$. The plane of the coupling spring 9 is placed in such manner as to bisect the axis of the bobbin 51. Since the free height $2 \cdot l_1$ of the pivot springs may be reduced to a few millimetres and by making the effective length of the needle $l_2$ several centimetres, there are obtained considerable amplifications of the displacements, which may be twenty times as great or more, without any play or wear, since all the pivots are replaced by springs.

Fig. 12 indicates how the device above described acts not only as a displacement-amplifier, but even as a transformer of moments of inertia.

The needle 61 oscillates about the pivot 62 and it is loaded by the springs 63, 64, the moment of elasticity of which is $W_2$. The needle is coupled to a piston motor 65, 66 by means of the pivots 67, 68 and the springs 69, 70. The moments of elasticity W, the moments of inertia K and the coefficients of absorption A of the motor, of the needle and the coupling are respective $$W_1, W_2, W_{12}, K_1 = m_1 \cdot l_1^2, K_2 = m_2 \cdot l_2^2/4, A_1, A_2$$

In order to adapt the moments of inertia, the following may be selected:

$$2l_1 = l_2 \sqrt{\frac{m_2}{m_1} \cdot \frac{W_1}{W_2}}; \quad W_1 = W_2; \quad 2l_1 = l_2 \sqrt{\frac{m_2}{m_1}}$$

In other terms, the ratio $2l_1:l_2$ between the free height $2l_1$ of the pivot springs 10, 11 and the effective length $l_2$ of the needle must be approximately equal to the square root of the ratio between the mass $m_2$ of the needle and the mass $m_1$ of the movable equipment of the motor.

In order to evaluate, as a first approximation, the power required by the oscillograph (the coupling coefficient $k$ being close to one), it is possible to use the following formula:

$$N = \tfrac{1}{2}(\omega a_m)^2 \sqrt{A^2 + \left(\omega K - \frac{W}{\omega}\right)^2} \text{ [watt.10}^7\text{]}; \quad \omega = 2f$$

It is frequently advantageous to reduce A to a minimum and to compensate for the mechanical resonance of the oscillograph by an electric circuit, such as $L_k$, $C_k$, $R_k$ in Fig. 13, where the mechanics of the oscillograph is represented by a similar electrical diagram comprising a transformer included in the primary circuit $L_1$, $C_1$, $R_1$ and the secondary circuit $L_2$, $C_2$, $R_2$, the coupling coefficient being $k$.

According to Fig. 14, the curve of mechanical resonances 101 of the oscillograph is compensated to a certain degree by the curve of electrical resonances 102. A manual or automatic commutator 103 (Fig. 13) permits the recording, either of any oscillatory phenomenon originating from the generator 104, or of a sinusoidal or other current serving for the marking of time and emanating from the generator 105.

In accordance with the invention, it is possible, with the assistance of about twenty watts, to record frequencies up to several thousand Hertz, for example, with graphic amplitudes of a few millimetres.

Numerical example:

$$m_1 = 10 \text{[g.]}, \; l_1 = 0.2 \text{[cm.]}$$

$$K_1 = 10\text{[g.]} \cdot (0.2)^2 \text{[cm.}^2\text{]} = 0.4\text{[g.} \cdot \text{cm.}^2\text{]}, \; m_2 = 0.2\text{[g.]}$$

$$l_2 = 2 \cdot l_1 \sqrt{\frac{m_1}{m_2}} = 3\text{[cm.]}$$

$$K_2 = 0.2\text{[g]} \cdot (1.5)^2 \text{[cm.}^2\text{]} = 0.4\text{[g.} \cdot \text{cm.}^2\text{]}$$

$$K = K_1 + K_2 = 0.4 + 0.4 = 0.8\text{[g.} \cdot \text{cm.}^2\text{]}$$

$$W_1 = W_2 = 3 \cdot 10^6 \text{[g.} \cdot \text{cm./sec.}^2\text{]}, \; W = W_1 + W_2 = 6 \cdot 10^6$$

$$f_1 = \frac{1}{2\pi}\sqrt{\frac{W_1}{K_1}} = f_2 = \frac{1}{2\pi}\sqrt{\frac{W_2}{K_2}} = 450 \text{ Hertz}, \; k = 0.9$$

$$f' = f : \sqrt{1+K} = 450 : 1.4 = 320 \text{ Hertz}$$

$$f'' = f : \sqrt{1-K} = 450 : 0.33 = 1400 \text{ Hertz}$$

$$A_1 = A_2 = 200\text{[g.} \cdot \text{cm.}^2\text{/sec.]}, \; A = A_1 + A_2 = 400$$

$$q_1 = q_2 = 2 \cdot \sqrt{K_1 \cdot W_1} : A_1 = 10$$

movable bobbin: diameter $d=3$ cm., air gap 0.2 cm., number of spirals $n=2\times2000=4000$, wire $\phi=0.05$ cm., max. current $i=0.06$ amp.$=0.006$ c. g. s., magnetic field $H=10,000$ gauss, maximum force of the bobbin $F=H\cdot\pi\cdot d\cdot n\cdot i=100,000\cdot\pi\cdot3\cdot4000\cdot0.006=2,300,000$ dynes$=2000[g.]$, stationary angular amplitude of the point of the needle $\alpha=Fh\cdot55°:W=2.3\cdot10^6\cdot0.2\cdot55°:6\cdot10^6=4°$, stationary amplitude of the movable bobbin $a_1=a_2\cdot l_1:l_2=0.013$ cm., amplification $l_2:l_1=3:0.2=15$, electric power required $N=i^2:R_b=0.06^2\cdot4000$ ohms$=15$ watts compensator filter of the resonance at 320 Hertz:$lk=2$ henries, $C_k=0.25$ microfarad, $R_k=\omega K$, $L:Q_k=2000\cdot2:10=400$ ohms, power of the filter approximately 15 watts.

Summarising, the numerical example mentioned permits the recording of frequencies up to about 1500 Hertz with a needle length of 3 cms., a graphic amplitude of 2 mms. and a power of approximately 15 watts.

The thickness of the springs may be as follows: bronze diaphragm spring 0.6 mm., steel pivot spring 0.4 mm., steel coupling springs 0.2 mm.

In a modification, according to Figs. 15 and 16, the suspension diaphragm or membrane may be composed of several, e. g. four, cranked spring blades 11 electrically insulated from one another and serving as metallic conductors for supplying the windings 112 of the movable bobbin 113. Each blade or leaf 111 is riveted on the insulating rings 114, 115 by two rivets 116, 117, one of which acts as a connecting terminal for a wire of the winding. The leaf spring assembly is fixed to the core 113 by screws 118 and the insulating ring 119. The terminals, such as 120, permit each insulated blade to be connected to the exterior. The screws, such as 121, sliding in grooves 112, allow the elastic force of the membrane to be varied without displacing the electrical connections.

In order that the movable bobbin, such as 113 in Fig. 16 or 4 in Fig. 2, may comprise windings which will carry a high electrical, for example, anodic potential, without it being necessary to increase the air gap, the permanent magnet 1 and the armatures 2, 3 are insulated from the earth potential by insulating cross-bars such as 71, 72, and the metallic core 4 is insulated from the earth potential by an insulating post 73 of canvasite or the like.

The two separate windings, such as 5, 6 in Fig. 2 or 112 in Fig. 16, may be connected in series, in parallel or in push-pull in order to compensate for a continuous current. Since these windings are connected to fixed external terminals, it is possible to modify the external fitting without dismantling the apparatus.

Figs. 17 and 18 show a double oscillograph using two coupled writing devices or stylographs, such as those described with reference to Figs. 1–12 or 20–22. The two needles 81, 82 inscribe the markings on both sides of a ribbon of transparent paper 83, which is supplied from a storage drum 84, is guided by the rollers 89 to 91 and is advanced by the driving rollers 87, 88. The drum is supported by three rollers 89 to 91 located externally thereof. It is thus possible to obtain a considerable paper storage without having to increase the size of the apparatus. The paper being transparent, the two graphs or sets of markings on the front and back thereof appear superimposed, which enables their respective phase displacements to be instantly noted. In order to emphasize the distinctions, it is possible to use inks of different colours coming from reservoirs 184, 185. If, instead of superimposing the two charts, it is desired to record them side by side, it is sufficient to remove one of the stylographs from the panel 186. Each stylograph is supported by a flange or plate 90a, the screws of which may serve to adjust the distance from the panel.

As a modification, it is possible to wind on to the drum 84 a strip of paper folded in two, this being unfolded after recording has taken place. In this way, there are obtained parallel recordings of twice the size without increasing the size of the apparatus.

The driving rollers 87 are actuated by the friction disc 93 along which the wheel 94 may be displaced, thereby varying the speed of the paper. This wheel is displaced by a lever 95. A second lever 96 enables, for example, the speed of the motor 97 to be additionally varied. It is thus possible to vary the speed of the paper within very wide limits according to the frequency to be recorded. The chassis 98 is such that the elements of two separate amplifiers may be located thereon.

In the oscillograph described with reference to Figs. 1–12, the axis of the needle at rest must make an acute angle with the surface of the recording strip. The result is that the charts are affected with a circular distortion. It is theoretically possible to remedy this by incurving the recording strip at this point during its passage beneath the needle. Nevertheless, the practical form of this correction is difficult so long as the pivot of the needle is fixed, because then the pressure of the needle point on the recording strip does not have the required elasticity at its disposal.

The device described with reference to Figs. 20 to 33, overcomes these disadvantages. It comprises a virtual needle pivot which possesses a controllable axial elasticity and which in addition only uses up a very reduced deformation energy. Under these conditions, it is simple to incurve the recording strip 209 as it passes underneath the needle 201 in accordance with the segment 246 of a circle, the centre of which coincides with the pivot of the needle. The incurving may be communicated to an originally flat strip by means of a concave pulley located beneath the sector of oscillations of the needle and two convex pulleys located on opposite sides of this sector. These pulleys may be split up into several coaxial rollers separated by spaces.

The recording needle 201 is suspended by four cranked spring blades 202—205 disposed crosswise in a plane which is perpendicular to the needle axis in the rear position. Each of these blades is equivalent to four levers and four springy pivots free from play and wear. Thus, the needle 201 is suspended by a total of sixteen levers and sixteen pivots. Therefore, the needle oscillates about the resultant virtual pivot 206 which may be elastically displaced along the axis 207 and only along this axis. Consequently, the point 208 of the needle exerts a controllable elastic pressure on the recording strip 209, and it may describe graphs, such as the sinusoid 210, which are free from circular deformation.

Each cranked spring 202—205, is provided with a circular groove in which may be shifted a fixing screw such as 211 or 212. It is thus possible independently to control the drawback forces which are exerted on the needle in accordance with the oscillation angles 213 and the pressure angle 214, the plane of the paper making, with the axis 207 of the needle, an angle of inclination 215 which is between 30° and 90°.

The needle 201 is mechanically coupled with an electro-dynamic motor through the intermediary of a coupling spring 216 comprising two pairs of symmetrical cranks and disposed, in the rest position, in a plane parallel to the suspension springs 202—205. This spring 216 includes a slot shaped like an M and it is equivalent to eight levers and eight spring pivots. The suspension springs 202 to 205 have four axes according to Fig. 27, and the coupling spring has two axes according to Fig. 26. These springs could each be either of these two types, the essential feature being the bends at 90° or 180°, which may be combined in various ways.

The electro-dynamic motor comprises a permanent magnet 217 and the armatures 218 to 220, within the air gap of which a movable bobbin 221 is suspended by two systems of cranked springs 222—227 having three branches disposed in parallel star-points. The spring 222, 223 has the same form as the spring shown in Figure 15, while the spring 225, 226 may have the form of the spring shown in Figure 5. The movable bobbin 221 can thus only participate in movements of translational oscillations, rotational movements being excluded. The translational oscillations of the bobbin 221 are converted into amplified rotational movements of the needle 201 through the intermediary of the spring 228, the rod 229 and the cranked coupling spring 216. The point 208 of the needle 201 may thus execute amplified movements of translation in the ratio of $a:b$, because it oscillates about the virtual pivot 206, which itself oscillates axially along the axis 207.

In the same way as the cranked springs 202—205 for the suspension of the needle 201, the cranked springs 222—227 for the suspension of the bobbin 221 are provided with slots in which the fixing screws may be disposed. By varying the force of the springs, it is possible to vary the recording frequency limit of the oscillograph. In the same way, it is possible to vary the ratio $a:b$ by displacing the solid ring 230 and the locking rings 231, 232, which determine the spacing between the suspension springs 202—205 and the coupling spring 216.

These various adjustments enable the dynamic moments of the translational and rotational movable equipment to be adapted in such manner as to obtain the optimum phase relations and output. The energy used up in the suspension and coupling spring is the minimum, due to the great relative length of these.

The needle 201 is constituted of a light metal conical tube. The section 233 thereof is elliptical except at its ends, where it is circular. The point 208 is constituted by a sleeve of hard material such as sapphire or tubular steel. A rubber tube 234 connects the needle 201 to an ink reservoir 247. The connection between the solid needle 201 and the flexible tube 234 takes place near the virtual pivot 216 in such manner that no dynamic disturbances are formed. A steel wire 235 extends through the interior of the hollow needle 201. It automatically unplugs the orifice of the point 208 to a greater extent as the amplitude becomes greater, thus controlling the delivery of ink. The wire 235 is fixed to a ball 236 upon which there is acting a helical spring 237. The cover 238 of the reservoir is made of flexible and transparent material, such as Plexiglas. By pressing on the cover, the barometric pressure on the ink is increased and at the same time the wire 235 is pushed through the orifice of the point 208. The result of this is to start the flow, even if the ink has dried in the orifice of the needle 201.

It is possible to couple two electro-dynamic motors in push-pull, symmetrically with respect to the axis 207, by using a coupling spring 239 (Fig. 25). This permits the needle 201 to be dynamically balanced and the effective power to be increased.

In order to improve the flexibility of the suspension springs, it is possible to employ springs which are cranked three times, such as those shown in Figs. 28 and 29, disposed in star forms having 2, 3, 4, 5, 6 . . . branches.

The equivalent pivots and the rotational and axial movements of suspension springs in accordance with the invention are shown in Figs. 30–32. The axes of elements of such springs are indicated by Figs. 26 and 27.

Figs. 34 to 38 describe a two-dimensional oscillograph combining vectorially several components, the effects of which are superimposed on the same needle 308. This may inscribe Lissajous figures, letters, numbers or other two-dimensional designs, that is to say, flat designs.

The apparatus comprises a certain number $n$ of pairs of electro-dynamic motors, such as 301 and 302, 303 and 304, 305 and 306, disposed regularly in star form about the axis 307 of the recording needle 308. The number $n$ may be 2, 3, 4, 5 etc. Each pair comprises two motors, such as 301 and 302 diametrically opposed to one another. The angles included between the diameters are $360°:2n$. In the present example, there are three pair of motors, i. e. six motors altogether, and the angles are each 60°. Each motor, such as 301, comprises a movable bobbin 309 suspended by a system of springs such as 310, 311 in the air gap of a permanent magnet 312. Each bobbin comprises two windings such as 313, 314. When a winding 313 is traversed by an electric current oscillation of acoustic or sub-acoustic frequencies, the bobbin 309 carries out translational vibrations of amplitude $a$. The vibrations are transmitted to the needle 308 by the intermediary of rigid rods 315 and flexible steel wires 316, 317, forming swivel joints without play or wear. The needle is suspended by a system of cranked leaf springs 318—320 constituting a swivel joint which is springy in the axial direction. This swivel joint keeps the point of rotation 321 of the needle 308 in the axis 307, whilst permitting the point of rotation 321 to be displaced elastically along this axis. Thus, the translational vibrations of the bobbins, such as 309, are converted into amplified vibrations of the point of the needle 308, which may follow a curvature of the recording paper 322, at the same time exerting a certain pressure thereon.

The leaf springs suspending the needle are located, when at rest, in a plane perpendicular to the axis of the needle. Each leaf may consist of a certain number of sectors and annular segments.

The suspension of the movable bobbin may comprise two parallel systems 310, 311 constituted by leaf springs similar to those indicated at 318—320. The leaves may be disposed regularly star-fashion and number 3, 4, 5, 6, . . . .

In order dynamically to balance the control of the needle 308, two pair of diametrically opposed windings, such as 323, 325 or 324, 326, may be traversed in series or in parallel by the same electric current oscillation.

In the example described, the 12 pairs of windings, such as 323, 324, may be traversed by 6 different, simultaneous or phase-displaced electric current oscillations. Thus, the needle 308 describes two-dimensional markings, which faithfully reproduce the resultant effect of 6 components.

The needle 308 may be hollow and serve as an inking tube, the ink being brought from the reservoir 327 by the flexible tube 328. Since the point of rotation 321 is close to the union between the needle 308 and the flexible tube 328, this does not disturb the needle oscillations. The needle may contain a flexible metallic wire automatically plugging and unplugging the point of the vibrating needle.

The recording paper may be of rectangular shape 331 and be wound around the rigid cylinder 333. This cylinder may have imparted to it a rotational movement communicated frictionally from the driving wheel 334, and a movement of translation communicated by the wheel 335 which is engaged in a helicoidal groove 336 of the fixed shaft 337. The projection of the needle 308 on the surface of the paper describes a helicoidal line relatively to the point of this needle at rest. Once the sheet of paper 322 is smoothed, this line appears in the form of a succession of parallel and inclined lines such as 1–2, 2–3, . . . 5–6 in Fig. 38.

Means may be provided for automatically replacing the sheet of paper, thereby allowing the recording to proceed without interruption for many hours, and to be distributed on a succession of sheets of standard size.

To this end, the cylinder 333 is provided with an axial slot 338, the length of which is the same as the width of the paper sheet 331, and the breadth of which is a fraction of a millimetre. A roll of paper 339, capable of supplying several hundreds or thousands of sheets of paper, is positioned within the cylinder. The end of the paper 322 passes out through the slot 338, makes one complete turn around the cylinder 333, re-enters through the same slot, passes between two pairs of driving rollers 340 to 343, and makes another complete turn in the space between the cylinder 333 and the roll of paper 339. A knife 344, actuated by the cam 345, cuts the paper and frees the end 346 after recording.

The operation of automatic replacement is as follows: When the needle 308 has filled the sheet 322 with markings, the toothed wheel 347 or 347' strikes against the toothed driving wheel 348 or 348'. The rollers 340 to 343 cause the paper to advance by a length in a direction opposite to that which is communicated to the periphery of the cylinder 333 by the driving wheel 334. Simultaneously, a commutator diametrically reverses the electric supply of the electro-dynamic motors 301 to 306. As soon as the length of paper is replaced by the next succeeding one, the direction of rotation of the driving wheel 334 is reversed and the cylinder returns to its initial position. The registration of the first size is made in accordance with the lines 1–2 to 5–6 of the sheet 311. That of the next size is made in accordance with the inverted lines 6–7 to 10–11 of the sheet 322. The registration of each first line of a sheet 331 or 332 is effected whilst the cylinder 333 is stopped and the paper is displaced relatively to this cylinder at the same speed as the periphery of this cylinder is afterwards displaced relatively to the point of the needle. It would also be possible to utilise differences in peripheral speeds between that of the cylinder and that of the paper.

The result is an uninterrupted recording on a succession of standardised sheets of paper, the knife 344 automatically freeing the completed sheet, which may be withdrawn through the circular opening 349 formed in the side plates 350, 351 of the cylinder 333.

In order to replace the roll of paper 339, it is possible to unscrew the screws 352, 353, to pivot the supports 354, 355 about the axes 356, 357 and thus to withdraw the whole cylinder 333 and its contents.

The spring leaves, such as 318 to 320, may comprise parts constituted by segments of rings provided with slots. This arrangement enables the opposing force of the spring to be adjusted by causing the screws to slide in these slots.

In order that the oscillograph may reproduce frequencies up to a certain limit of F cycles/sec., the mechanical resonances are selected so as to be near to F. This may be obtained by suitably dimensioning the moment of inertia of the movable equipment associated with the needle 308 as well as the moment of elasticity resulting from the springs, such as 310, 311. Electric filters associated with the bobbins, such as 313, 314, allow the mechanical resonances to be compensated for in amplitude and in phase and thus enable a faithful reproduction of the oscillations up to the frequency limit to be obtained.

The indicator needle 401 (according to Figs. 39 to 41) is suspended by two cranked spring blades 402, 403, disposed, in the rest position, in a plane perpendicular to the axis of the needle. Each of these blades or leaves has four cranks and three straight portions. It is equivalent to four virtual pivots and to three torsion bars, the four pivots being provided with opposing springs having linear characteristics. The resultant of these eight pivots, eight springs and six torsion bars is a virtual swivel joint suspending the needle 401, said joint presenting opposing rotational and axial moments of elasticity, whilst being rigid radially.

Thus the needle 401 enjoys three degrees of freedom: it may sweep the angles 404 in the longitudinal plane, the angles ±405 in the transverse plane and carry out axial displacements ±406. The virtual swivel joint, however, is forced to remain along the axis 407. By making the width 408, the length 409 and the thickness 410 of each leaf of the spring of suitable dimensions, it is possible to obtain the desired opposing moments of elasticity in the longitudinal plane, in the transverse plane and along the axis 407.

The virtual swivel joint above described is free from play, wear and external frictions.

The length 409 of each blade element is at least twice as large as its width 408, which itself is at least three times greater than its thickness 410. The two blades 402, 403 of S-shape may be cut from one piece, forming a double S.

The needle or pointer 401 is mechanically coupled with the movable bobbin 411 by means of a leaf spring 412 disposed in a plane approximately perpendicular to the axis of the pointer, when at rest, and formed with two cranked portions similar to those of the blade 402 of the suspension spring. The coupling spring therefore comprises four springy virtual articulations and three torsion bars by which it, like the pointer 401, is permitted to enjoy three degrees of liberty, whilst at the same time the displacements of the bobbin 411 are transmitted to it without play, wear and external frictions.

The bobbin is suspended by two parallel systems of cranked blades 413 to 418 disposed star-fashion in threes, this arrangement being equivalent to twenty-four pivots, twenty-four opposing springs and eighteen bars. Thus, the bobbin 411 is forced to execute translational displacements (parallel to the magnetic axis 419).

Each cranked blade 413 has three cranked portions and it is terminated by a circular segment provided with a circular slot in which the locking screw 420 may be displaced. In this way, the opposing force being exerted on the movable bobbin 411 may be varied or adjusted.

This bobbin is of cylindrical shape, the windings 421, 422 being wound circularly. It is suspended in the annular air gap existing between the core 423 and the pole piece 424. It is itself of light non-magnetic metal, thereby dissipating the heat generated by the electric current. It may be slotted axially or not, according to whether a damping effect by induced currents is to be avoided or sought after. A permanent magnet, divided into two cylindrical segments 425, 426, is secured between the pole piece 424 and the annular armature 427. It thus shows two slots parallel to the magnetic axis 419 and in which the magnetic flux is practically zero. The core 423 has a slot 428 and a groove 429 parallel to the magnetic axis 419, the magnetic flux in said slot and groove also being practically zero. The suspension springs 402, 403 are screwed into the groove of the core by the intermediary of bridges 430, 431, the height of which is adjustable. The needle 401 may thus be displaced in the slots of the magnet and of the core. This core is of tubular shape and the suspension spring 412 may be displaced in the interior thereof. The spring 412 is connected to the bobbin 411 by a solid rod 432 of electrically insulating material. The rods 433 to 435 being insulated from the magnetic armatures 424, 427 by insulating cross members, the entire magnetic system is insulated from the earth potential and the windings 421, 422 may be placed under high tensions without risk of electrical discharge in the air gap.

The needle or pointer 401 acts as an amplifier of displacements in the ratio $(a+b):a$, where $a$ is the distance between the plane of coupling and the plane of suspension of the needle, and where $b$ is the length of the needle. This distance $a$ remains constant, even when the needle oscillates axially. In conditioning this ratio in accordance with the moments of inertia of the needle and of the movable bobbin, the needle acts as a tuned mechanical transformer, or as an adapter of dynamic moments. By varying the forces of the suspension springs of the bobbin and the needle, as well as those of the coupling spring, it is possible to vary the frequency limit up to which the needle responds faithfully to the variations of current, or the amplitude of its displacements.

The readings of the needle or pointer 401 may be read directly in relation to a dial 441 or may be recorded on a movable and flexible strip 442, for example, of paper. The dial may be in front of or laterally of the pointer. The surface of the recording strip may make an angle 443 between 60° and 90° with the plane of oscillation 444 of the pointer. The height $d$ of the circular distortion of the markings is reduced with the cosine of this angle 443. All this happens as if the length $b$ of the pointer were increased and became $b'$. Under the action of the pressure of the recording strip 442, the pointer carries out axial displacements 445 at the same time as it oscillates in the plane 444. When the frequency is high, the end of the pointer or needle naturally tends to oscillate along a straight line, under the effect of the forces of inertia which are exerted on the virtual swivel joint by which it is elastically suspended. By means of suitable inclinations, of the suspension and coupling springs, it is possible to assist this tendency at low frequencies.

The recording needle 401 may be hollow and connected to an ink reservoir 446 through the intermediary of a flexible tube 448. The connection between the needle and the tube is made in the vicinity of the virtual swivel joint, thus obviating dynamic disturbances. The needle may contain a steel wire 447 which automatically unplugs the orifice of the point as a function of the amplitudes. The cover 449 may be of transparent plastic material, such as Plexiglas. Thus, a pressure exerted on it presses on the ball 450 of the wire 447, thereby increasing the barometric pressure in the reservoir, which enables the point to be opened or the flow of ink to be initiated.

When the indicator is to be used, for example, as a micro-ammeter, the suspension springs must be very thin (in the region of a tenth of a millimetre). It is then useful to reduce the degrees of freedom of the needle in the axial direction. This may be obtained by suspending the needle 451 by at least two cranked leaf springs 452, 453, one being in a plane perpendicular to the axis of the needle in the rest position, and the other in a plane which contains this axis.

If the point of the needle is to execute two-dimensional movements, several movable bobbins conjugating their forces vectorially by means of coupling springs arranged in star fashion, the needle must be suspended by several cranked leaf springs, such as 443 to 435, arranged in star formation in a plane perpendicular to the axis of the needle in the position of rest.

In order to increase the power and to improve the dynamic equilibrium, it is possible to associate two bobbins which act in push-pull mechanically on the same needle.

As a modification, the needle may be suspended by one or two leaf springs located, at rest, in a plane containing the axis of the needle and constituting a virtual pivot, the coupling spring formed by one cranked blade or leaf constituting a virtual swivel joint.

The devices described are essentially applicable to electro-dynamic indications. It may, however, also be applied to barometric, thermic, tachymetric, temporal, spatial or physical indications of any kind whatsoever.

I claim:

1. A dynamic indicator, comprising, in combination, a movable member carrying out translatory oscillations, a movable needle carrying out rotary oscillations relatively to an indicating surface, at least one spring blade connected to said needle and having a plurality of openings formed therein and cranked portions extending between said openings, the length of each cranked portion being greater than its width, said cranked portions being located in the plane of said spring blade when the latter is at rest, the plane of said spring blade extending at an angle to the direction of said translatory oscillations which ranges between zero and 45°, and means operatively connecting said blade to said movable member.

2. Indicator according to claim 1, comprising a plurality of motive members, each motive member comprising a metallic bobbin core, and means insulating said core from the electrical potential of the earth.

3. An indicator according to claim 1, comprising an additional cranked spring blade, said two cranked spring blades supporting the needle and being located in two different intersecting planes.

4. An indicator according to claim 1, comprising at least two additional cranked spring blades, said plurality of cranked spring blades being disposed star-fashion in one and the same plane about a central space, for fixing said needle.

5. An indicator according to claim 1, comprising fixing screws connecting the needle to the blade.

6. An indicator according to claim 1 wherein the needle comprises elliptical sections.

7. An indicator according to claim 1, wherein said movable member consists of a bobbin traversed by electrical current, the indicator further comprising electrical filters and means compensating the mechanical resonances of the needle by said electrical filters.

8. An indicator according to claim 1, wherein said needle is connected to several spring blades located in orthogonal planes.

9. A spring for use in a dynamic indicator, said spring consisting of a substantially flat blade having six parallel arm portions separated by slots and joined to each other alternately at opposite ends and a portion joining the outer arm portions and extending transversely to the direction of the arm portions at a distance therefrom, thereby forming a slot communicating with three of the slots extending between the arm portions.

10. A dynamic indicator, comprising, in combination, a movable member carrying out translatory oscillations, a movable needle carrying out rotary oscillations relatively to an indicating surface, a spring blade pivotally supporting said needle, another spring blade supporting said movable member and means operatively connecting said needle to said movable member, each of said spring blades having a plurality of openings formed therein and cranked portions extending between said openings.

11. A dynamic indicator, comprising, in combination, a reciprocable bobbin, at least one spring blade supporting said bobbin and consisting of cranked radially extending arms and recesses formed between said arms, a movable needle carrying out rotary oscillations relatively to an indicating surface, a spring blade pivotally supporting said needle and consisting of cranked radially extending arms and recesses formed between said arms, the second-mentioned spring blade constituting a virtual pivot for said needle, a spring blade connected with said needle and consisting of a plurality of parallel arms and slots formed between the arms, means connecting adjacent ends of the arms of the last-mentioned spring blade to said needle and means connecting the opposite end of the last-mentioned spring blade to said bobbin, whereby the reciprocation of said bobbin is transmitted to said needle.

References Cited in the file of this patent

UNITED STATES PATENTS

| | | |
|---|---|---|
| Re. 20,767 | Finch | June 21, 1938 |
| 911,534 | Alford | Feb. 2, 1909 |
| 1,214,708 | Okhuizen | Feb. 6, 1917 |
| 1,523,345 | Madsen | Jan. 13, 1925 |
| 1,883,249 | Spencer | Oct. 18, 1932 |
| 2,151,638 | Genschmer | Mar. 21, 1939 |
| 2,183,685 | Lingg | Dec. 19, 1939 |
| 2,275,868 | Scheldorf | Mar. 10, 1942 |
| 2,348,225 | Petty | May 9, 1944 |
| 2,407,757 | MacCallum | Sept. 17, 1946 |
| 2,478,329 | Shoper | Aug. 9, 1949 |
| 2,487,604 | Short | Nov. 8, 1949 |
| 2,500,190 | Lee | Mar. 14, 1950 |
| 2,524,564 | Gorham | Oct. 3, 1950 |
| 2,540,660 | Dreyfus | Feb. 6, 1951 |